M. PRESSLER.
SPRING WHEEL.
APPLICATION FILED NOV. 7, 1908.
957,574.
Patented May 10, 1910.
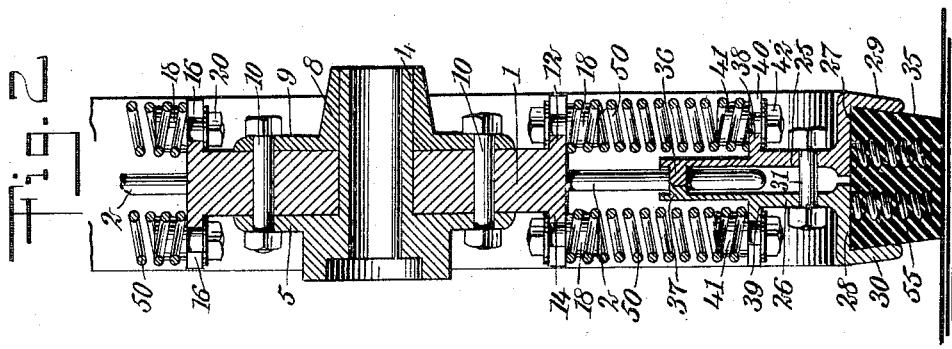
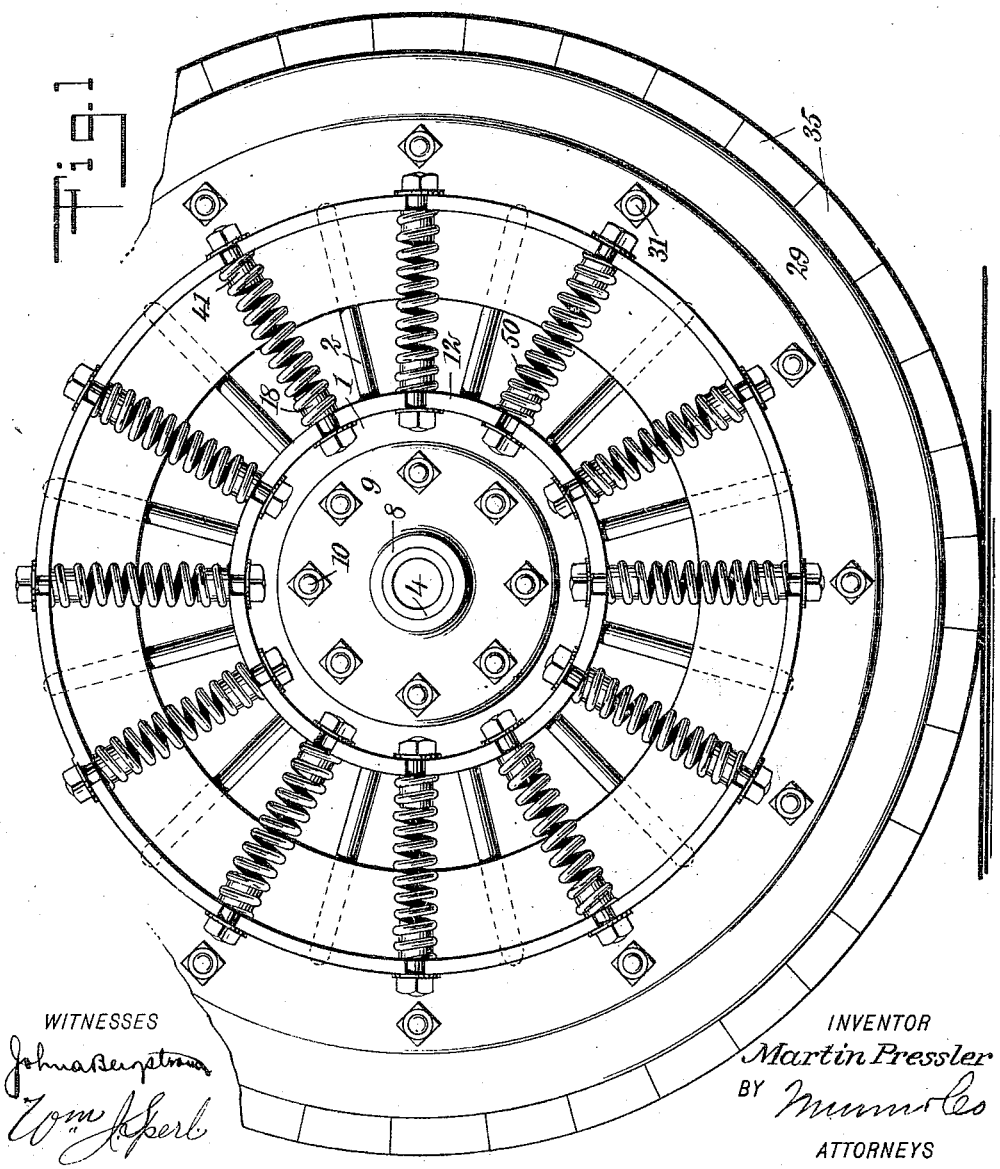
WITNESSES
INVENTOR
Martin Pressler
BY
ATTORNEYS

UNITED STATES PATENT OFFICE.

MARTIN PRESSLER, OF STAMFORD, CONNECTICUT.

SPRING-WHEEL.

957,574.   Specification of Letters Patent.   Patented May 10, 1910.

Application filed November 7, 1908. Serial No. 461,507.

*To all whom it may concern:*

Be it known that I, MARTIN PRESSLER, a citizen of the United States, and a resident of Stamford, in the county of Fairfield and State of Connecticut, have invented a new and Improved Spring-Wheel, of which the following is a full, clear, and exact description.

This invention relates to resilient wheels adapted for use in connection with automobile trucks and the like.

The object of the invention is to provide an improved wheel construction whereby resilient means may be located between the hub and the tire of the wheel for absorbing shocks due to inequalities or obstructions in the path over which the wheel is passed.

Reference is to be had to the accompanying drawings, forming a part of this specification, in which similar characters of reference indicate corresponding parts in both the figures, and in which—

Figure 1 is a side elevation of a wheel embodying my invention; and Fig. 2 is a central vertical section broken away at the upper end.

In the present embodiment the wheel comprises a hub 1 having spokes 2 radiating therefrom, which may be cast integral therewith. The hub 1 is mounted about a sleeve 4, having a flange 5, and a sleeve 8 having a flange 9 is mounted about the sleeve 4. The hub 1 is held between the flanges 5 and 9 and secured thereto by bolts 10, passing through the flanges and the hub. The periphery of the hub 1 is provided with annular flanges 12 and 14 having notches 16 extending from the outer edge of said flanges for the reception of studs 18 which are screw-threaded and held in place by means of nuts 20.

The rim of the wheel comprises annular members 25 and 26, having flat peripheral surfaces 27 and 28 and inclined flanges 29 and 30, respectively, which form seats for the reception of the tire blocks 35. Said members 25 and 26 are clamped against the tire blocks by means of bolts 31. The annular members 25 and 26 have flat webs extending inwardly from the tire bearing and separated by small projections 36 and 37. These flat webs are spaced apart a sufficient distance to allow the spokes 2 to pass between them freely, and the projections 36 and 37 act as clamping means to prevent the rim from rotating with respect to the hub of the wheel. Extending laterally from the flat webs of the members 25 and 26 are flanges 38 and 39, having notches 40 for the reception of studs 41 held in place by nuts 42.

Between the hub 1 and the rim of the wheel, a series of springs 50 are placed, having their ends surrounding the studs 18 and 41, respectively.

The tire blocks 35 may be formed of fiber composition and have springs 55 embedded therein to prolong the life of said blocks. The sleeve 4 may be provided with a keyway to coöperate with a key upon a driving shaft, if the wheel is intended to be a driving wheel, otherwise, the sleeve 4 may be formed with a smooth bore as shown.

From the construction above set forth, it will be seen that the rim of the wheel may move radially with respect to the hub, and the shocks received by the tire are absorbed by the springs 50.

Having thus described my invention, I claim as new and desire to secure by Letters Patent:

1. A vehicle wheel, comprising a hub provided with spokes and oppositely arranged annular flanges having notches in their edges, a rim formed of two members, each provided with an angular flange at its outer end, and an inwardly projecting web having a projection on its inner face and an annular lateral flange on its outer face, said flange having notches in its edges, the said members being secured together by bolts arranged between the flanges thereof, the angular flanges forming a tire retaining groove and the webs, a chamber in which the spokes slide, studs detachably secured in the notches of the flanges of the hub and rim, and springs resting upon the said flanges and into which project the said studs.

2. In a vehicle wheel, the combination of a hub having spokes and oppositely arranged annular flanges, a rim formed of two members secured together and having their external peripheries shaped to form a tire-retaining groove, the members having inwardly extending webs spaced apart to form a chamber therebetween to receive the spokes and each provided with an annular laterally projecting flange, studs on the flanges of the hub and rim, and springs resting on the said flanges and into which project the studs.

3. In a vehicle wheel, the combination of a hub having spokes and oppositely arranged annular flanges, a rim formed of two members secured together and having their peripheries shaped to form a tire-retaining groove, the members being provided with inwardly extending and spaced webs and between which the spokes loosely extend, and with annular laterally projecting flanges between the tire-retaining groove and the ends of the webs, studs detachably secured to the flanges of the hub and rim, and springs resting on the said flanges and into which project the studs.

In testimony whereof I have signed my name to this specification in the presence of two subscribing witnesses.

MARTIN PRESSLER.

Witnesses:
 JOHN W. LEACH,
 CHAS. L. LEDIN.